United States Patent [19]

Blank et al.

[11] Patent Number: 4,669,017
[45] Date of Patent: May 26, 1987

[54] CLEANING CASSETTE

[76] Inventors: Thomas H. Blank, Schumannstrasse 13; Gabriel Cohn, Im Sachsenlager 7,, both of 6000 Frankfurt/Main, Fed. Rep. of Germany

[21] Appl. No.: 638,474
[22] PCT Filed: Dec. 9, 1983
[86] PCT No.: PCT/DE83/00205
    § 371 Date: Jul. 30, 1984
    § 102(e) Date: Jul. 30, 1984
[87] PCT Pub. No.: WO84/02418
    PCT Pub. Date: Jun. 21, 1984

[30] Foreign Application Priority Data

Dec. 11, 1982 [DE] Fed. Rep. of Germany ....... 3245877

[51] Int. Cl.⁴ .......................... G11B 23/04; G11B 5/41
[52] U.S. Cl. ..................... 360/128; 15/210 R
[58] Field of Search ............. 360/128, 137; 15/210 R

[56] References Cited

U.S. PATENT DOCUMENTS

| | | |
|---|---|---|
| 3,594,850 | 7/1971 | Wellington .................. 15/210 R X |
| 3,783,470 | 1/1974 | Myers et al. ................ 15/210 R |
| 3,789,452 | 2/1974 | Nemoto ...................... 15/210 R |
| 4,100,643 | 7/1978 | Horian et al. ............... 15/246 |
| 4,134,170 | 1/1979 | Boudreau .................... 15/210 R X |
| 4,324,014 | 4/1982 | Stutz, Jr. et al. ............ 360/137 X |

FOREIGN PATENT DOCUMENTS

| | | |
|---|---|---|
| 0028708 | 5/1981 | European Pat. Off. . |
| 1937152 | 2/1971 | Fed. Rep. of Germany . |
| 2073470A | 10/1981 | United Kingdom . |

Primary Examiner—John H. Wolff
Attorney, Agent, or Firm—Larson and Taylor

[57] ABSTRACT

The cleaning cassette is intended to clean signal heads in systems operated with magnetic tape cassettes, for example, in cartridge tape recorders, and is provided with a cleaning element (18) which mechanically acts upon the parts to be cleaned. In order to impregnate the cleaning element, preferably a driven cleaning tape (18) with cleansing fluid directly during the cleaning operation, the housing (10) of the cassette is provided with a cavity (12) designed for receiving the cleansing fluid. The said fluid is fed through a batching means (16) via an outlet valve (40) to the cleaning tape (18). The batching means (16) and the outlet valve (40) will supply the cleaning tape (19) with cleansing fluid only if the same has been circumferentially driven by the driving mechanism (58, 72) of the system. The cleaning tape (18) impregnated with cleansing fluid will thereupon get into contact with the signal heads (56) and the parts of the driving mechanism (58, 72) to be cleaned.

20 Claims, 7 Drawing Figures

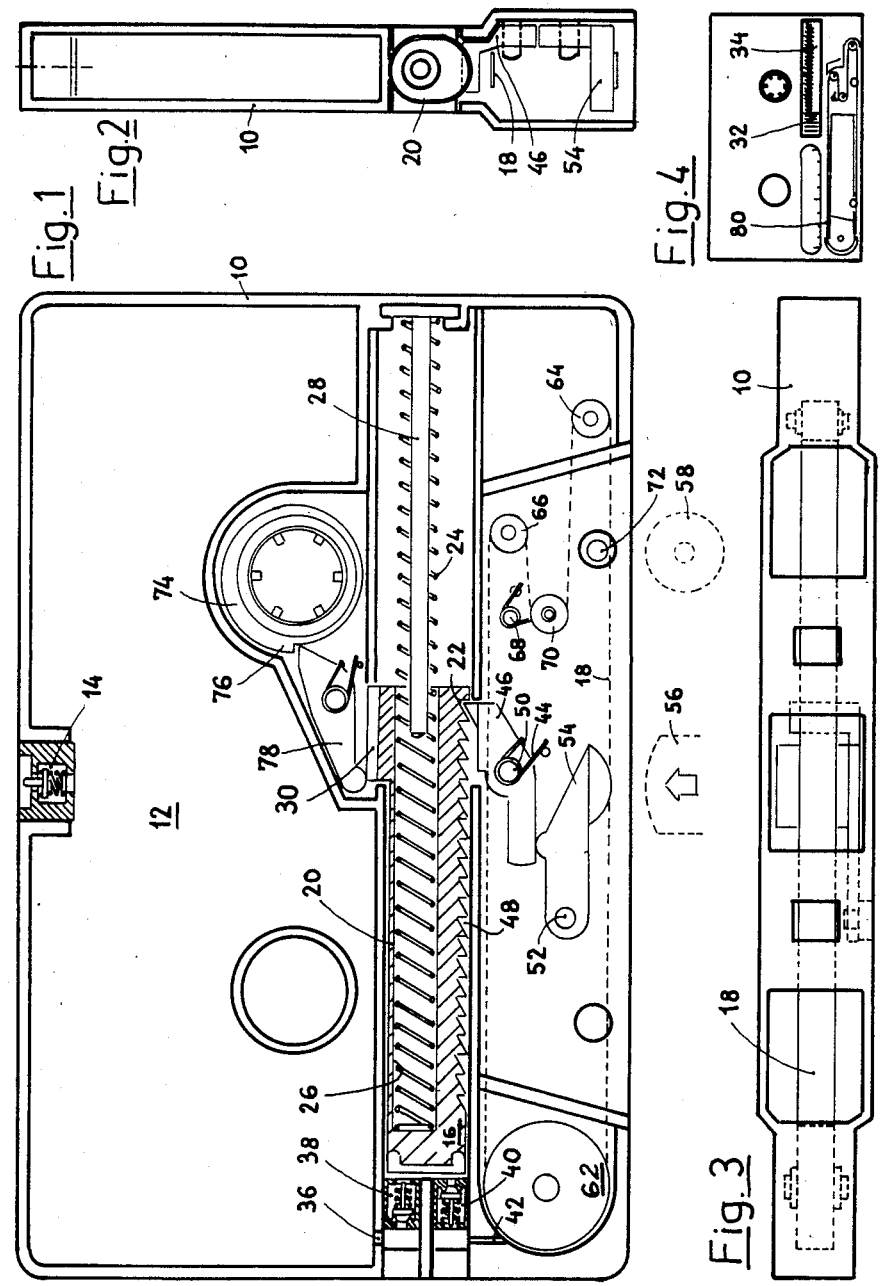

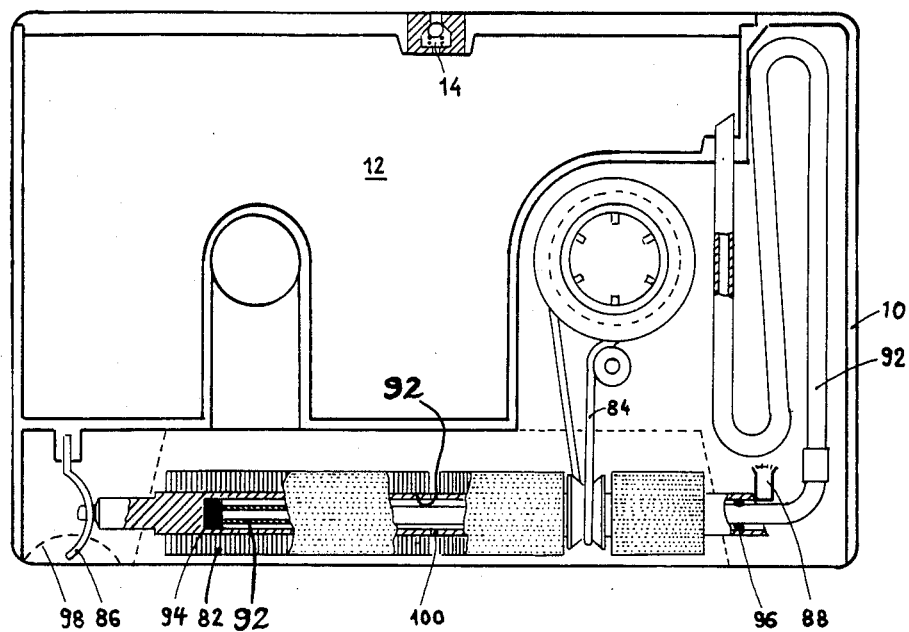
Fig.5
Fig.6
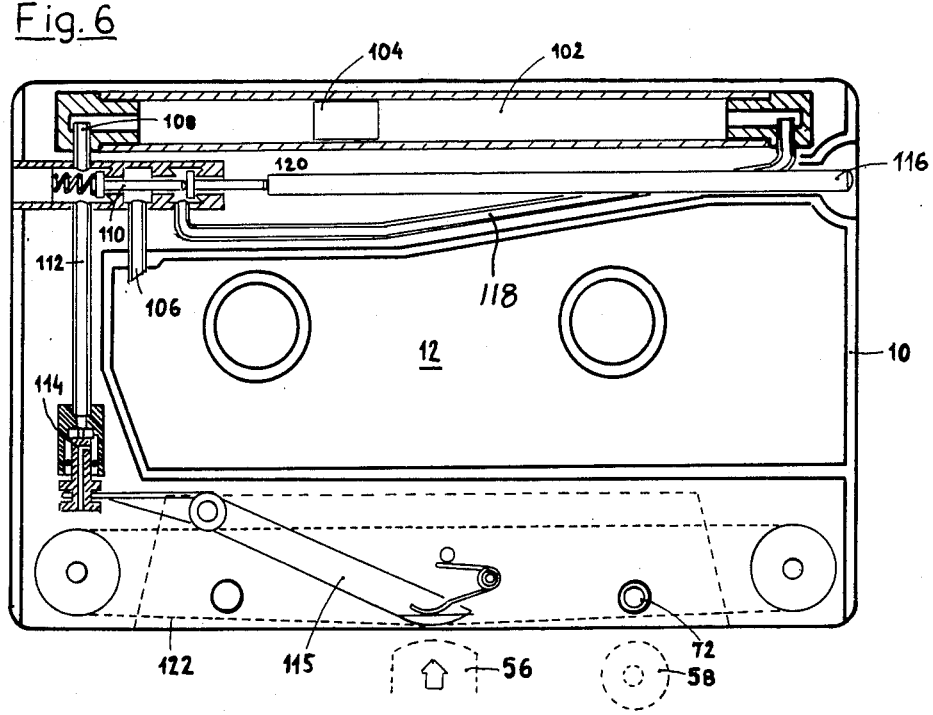

CLEANING CASSETTE

The present invention is concerned with a cleaning cassette intended to clean signal heads of systems operated by magnetic tape cartridges, such as cartridge tape recorders, video recorders and storage devices of data processing, comprising a cleaning element which, mechanically, is in frictional engagement with the signal head and which is wettable by means of a cleansing fluid.

Signal heads, i.e. recording, reproducing and erasing heads of magnetic tape operated systems, conventionally, have been cleaned manually by means of cotton sticks and a cleansing fluid, such as benzine, Freon or the like, or by resorting to a cleansing cartridge inserted into and driven by the system in place of the normal musicassette, video or data cassette. In the state-of-the-art cleaning cassettes, the cleaning element is a pivoted arm which, during operation of the cassette, is reciprocated by an eccentric drive and, with a small felt pad, rubs along a signal head. The felt pad may be externally impregnated with a cleansing fluid by means of a pipette or flask. As the cleansing fluid is volatile, the major part thereof has already evaporated before the cassette has been inserted and put into operation. Also, a very small amount of cleansing fluid can respectively be put on the felt pad rubbing and lubricating always with the same small surface along a single signal head thereby quickly adopting a large number of sharp-edged dirt and metal oxide particles thus being likely to damage the same, while other signal heads next thereto and the parts of the driving mechanism, i.e. capstan shaft and back pressure roller, getting into contact with the magnetic tapes, are not cleaned at all.

In order to simultaneously clean all signal heads and driving parts getting into contact with the magnetic tapes and to better distribute the removed dirt particles along the cleaning element, conventionally, cleaning cassettes have been used that are provided with a cleaning tape guided like magnetic tapes, with the cleaning tape being designed to either run dry, in which case its abrasive effect will be detrimental, or to be externally impreganted with cleansing fluid. However, wetting of the tape is a complex operation. Moreover, it will take so long that the major part of the fluid has evaporated before the wetted portion of the tape has reached the signal head.

It is, therefore, the object of the present invention to provide a cleaning cassette of the afore-mentioned type, permitting fast and easy handling and safeguarding thorough cleaning of all signal heads and parts of the driving mechanism that will get into contact with the magnetic tapes.

The afore-described problem, in accordance with the invention, is solved in that the cassette is formed with a cavity for receiving at least the volume of cleansing fluid required for one cleaning operation, and that an outlet valve disposed in a line between the cavity and the cleaning element, is operable by the cassette driving mechanism.

The new cleaning cassette is put, like a normal cassette, into the system without requiring a complicated wetting of the cleaning element so that it will also be suitable for use with motor cars. The cleaning fluid, with the drive running, is put onto the cleaning element to reach immediately thereafter the parts to be cleaned. Hence, evaporation will not constitute a problem any longer.

In order that a plurality of cleaning operations can be performed without requiring a further intake of cleansing fluid, according to a preferred embodiment of the invention, the major part of the inner cavity of the cartridge forms a sealed compartment provided with an inlet valve for receiving cleansing fluid. By way of alternative, the cavity could also be a recess in the cassette housing insertable into which is a container to receive a cleansing fluid and adapted to be connected to the line leading to the outlet valve.

Depending on the device, the cassettes are inserted either horizontally or vertically. To render the new cleaning cassette position-independent, in the following a plurality of practical forms of embodiment will be described. For example, a piston pump may be provided which is manually operable against the spring force, or, by way of alternative, pressure may be applied to the cleansing fluid in the cavity by means of compressed gas, by its own vapor pressure or by a spring-loaded piston, which pressure, during opening of the outlet valve, will feed the cleansing fluid to the cleaning element or to a part wetting the latter.

Different types of tools can form the cleaning element, e.g. brush-type tools or tools of conventional construction, provided with pivoted arms. All cases involve the advantage that only after insertion of the cassette into the device to be cleaned, automatically, is the cleaning fluid applied to the cleaning element. However, preference is given to a cleaning element formed by an endless tape circumferentially drivable by the cassette driving motor, or to a tape adapted to be wound from one reel to another reel. Feasibly, the tape, on the open side of the cassette, substantially is guided like a usual cassette tape to get into contact with the same signal heads and drive parts as the latter.

In order to permit, from time to time, replacement of a contaminated cleaning tape, another preferred embodiment of the invention provides that a corresponding slot is formed in a side wall of the cassette through which a cleaning tape can be removed and replaced.

The invention will now be described in greater detail by way of examples of embodiment as illustrated in the drawing, wherein:

FIG. 1 is a longitudinal section through a cleaning cassette according to the invention;

FIG. 2 is a cross-section through the cassette according to FIG. 1;

FIG. 3 is a plan view of the open side of the cassette according to FIGS. 1 and 2;

FIG. 4 is a simplified side view in reduced scale of the cassette according to FIGS. 1 to 3;

FIG. 5 is another form of embodiment having a capillary tube between the cavity and the outlet valve;

FIG. 6 is another form of embodiment comprising a batching cylinder having a freely displaceable piston, which, alternatively, with opposite sides thereof is adapted to be connected to the cavity;

Figure 7:
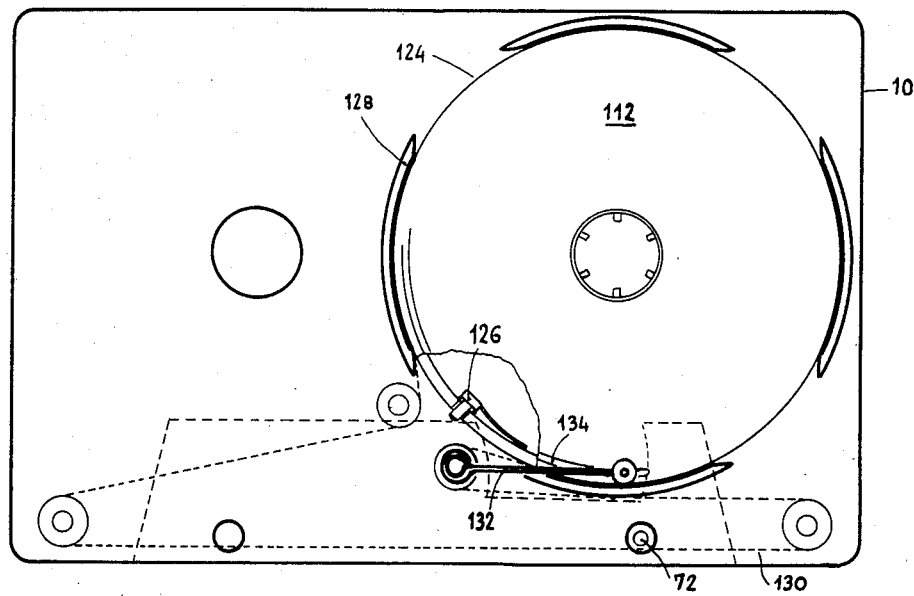
FIG. 7 is another form of embodiment comprising a cavity disposed in a drum rotatable by the cassette driving mechanism, and an outlet valve provided on the drum.

The cleaning cassettes as shown are of the standard dimensions of customary magnetic tape cassettes. The case as described refers to a cassette for a cartridge tape recorder. The housing is generally designated by reference numeral 10. It is substantially divided into three sections. The major part is occupied by a closely sealed cavity 12 into which cleansing fluid can be filled via a spring-loaded non-return valve 14 forming the inlet valve. Provided in the central area of the cassette is a portioning or batching means 16, in the form of a piston pump, and disposed in the expanded area of the cassette are guiding and clamping rolls for an endless cleaning tape 18. The piston pump comprises a cylinder 20 integrated into cassette housing 10 in which is guided an axially displaceable piston 22. The latter—viewed from FIG. 1—is loaded to the left by a compression spring 24. The relatively extended spring 24 on the lefthand side—viewed from FIG. 1—is seated in a bore 26 in piston 22 and, on the righthand side, is seated on a bar 28 extending into bore 26. Piston 22 in the rear end thereof is formed with a head member 30 having lateral gripping surfaces 32 (see FIG. 4) which, for retracting piston 22 to the right (viewed from FIG. 1) against the force of the compression spring 24 through opposite longitudinal slots 34 in the lateral faces of the cassette housing, can be seized by the operator's fingers.

If piston 22, under the tension of spring 24, is drawn to the right, cleansing fluid will be sucked into cylinder 20 via an outlet opening 36 of cavity 12 and a spring-loaded non-return valve 38. If, subsequently, spring 24 returns piston 22 to the left into the position as drawn, the latter will urge the cleansing fluid from cylinder 20 via an outlet valve 40 in the form of a spring-loaded non-return valve into an outlet line 42 leading to the cleaning tape 18.

In order to supply cleansing fluid to tape 18 only during rotation thereof, a bar 46 preloaded in the closing direction by a spring 44 is disposed next to piston 22. Bar 46 will engage in ratchet-type manner a rack 48 extending longitudinally of piston 22. Bar 46 is rotatably seated on an axis 50 and may be swung by a one-armed lever 54 pivotally disposed at 52, into the released position if after switching on the cassette inserted into the device, the sound head 56, in usual manner, is advanced along with back pressure roller 58 against tape 18.

Cleaning tape 18 is closed per se and is guided over three guide rolls 62,64,66 and over a clamping roll 70 loaded by spring 68. The tape by the capstan shaft in cooperation with the back pressure roller 58 is circumferentially driven at 72 as is a normal magnetic tape of such a cassette, with the part of the cleaning tape 18 wetted via the outlet channel 42 getting into contact with all signal heads to be cleaned, such as the sound head 56, and parts of the driving mechanism, such as capstan shaft and back pressure roll 58.

The cleaning operation will be terminated when the system is turned off and the sound head 56 thereby retracted. The bar 46 will then maintain the piston 22 in the momentary position thereof. Conversely, it is desirable for the tape drive to be turned off when the piston 22 has displaced the predetermined amount of cleansing fluid from the cylinder 20 in order to prevent the tape 18 from rubbing dry along the signal heads over an extended period of time. For that purpose, a sleeve 74 to be placed into non-rotational engagement with the take-up drive during insertion of the cassette into the system, is provided where, normally, the take-up roll of the cassette is disposed, with the sleeve 74 including an external step 76 engageable by a resiliently biased switch-off lever 78. The latter, normally, takes a neutral position as a result of the spring force acting thereon, in which position sleeve 74 can freely move. However, if the piston 22, at the end of the pressure stroke, takes the position as drawn, head member 30 will strike switch-off lever 78 to swing the same into the blocking position as shown. By blocking the take-up drive by means of switch-off lever 78 und sleeve 74, the device will be turned off in usual manner.

FIG. 2 shows the arrangement of the parts in cross-section, with cylinder 20 having been given an oval configuration to attain a relatively large cylinder capacity, notwithstanding a predetermined small width of the cassette.

FIG. 3 conveys that the open front side of the cassette has the same openings as a normal cassette.

FIG. 4 shows that one of the side faces of housing 10, in the area of the tape guide, is provided with a correspondingly extending slot 80 permitting replacement of tape 18. In the example of embodiment according to FIG. 5, the cleaning cassette again generally designated by reference numeral 10, equally has a large inner cavity 12 for receiving cleansing fluid loaded via an inlet valve 14. However, in this case, the cleaning member is a rotatable and reciprocable brush 82 rotatingly driven by the take-up drive of the system via a belt 84. During that rotational movement, the end of brush roller 82 which—viewed from FIG. 5—is the righthand end sloping in the way as shown, is slightly pressed into contact with a stop means 88 by a spring U-bolt 86. As a result of the afore-mentioned sloping face, the brush roller 82 during rotation thereof at the same time performs a reciprocating axial movement.

Brush roller 82 is provided with a central blind-end bore 90 into which protrudes from the open right-hand end a capillary tube 92 connected to cavity 12. At the closed left-hand end of the blind-end bore 90, a sealing pad 94 disposed therein, by the action of the spring U-bolt 86, is urged against the mouth opening of the capillary tube 92 thereby maintaining the same normally closed. At the other end of the blind-end bore 90, a sealing ring 96 provides for sealing the annular gap between the circumferential wall of the blind-end bore and the tube 92 the inner diameter of which is dimensioned so small that the cleansing fluid cannot flow back therefrom into cavity 12.

Irrespective of the amount of cleansing fluid still contained in the cavity 12, and irrespective of what position is normally taken by the cleaning cassette in the system, the same can be so held in the operator's hand that the inlet opening of the capillary tube 92 is below the fluid level in the cavity 12. In order that the spring U-bolt is accessible the cassette housing is provided with a recess 98 illustrated in broken lines. If spring U-bolt 86 is then manually moved to the left (viewed from FIG. 5), the vapor pressure of the cleansing fluid which, preferably, is above atmospheric pressure, will urge the cleansing fluid through the capillary tube 92 toward the sealing pad 94. The movement of the fluid in the capillary tube can be well observed if transparent plastic material is used for the cassette housing and the capillary tube 92. As soon as the air has been expelled from the capillary tube in the manner described, spring U-bolt 86 will be released thereby closely pressing the sealing pad 94 against the end of the capillary tube 92 and, hence, keeping the fluid in capillary tube 92 independently of the following position of the cleaning cassette. If the cassette is now inserted into the device in the vertical or horizontal position and the driving mechanism of the cassette is started, in the afore-described reciprocating movement of the brush roller 82, the sealing pad 94 is cyclically lifted off the end of the stationary capillary tube 92 so that the vapor pressure or the pressure generated otherwise in cavity 12 will be able to urge at least the cleansing fluid contained in the capillary tube 92 into the blind-end bore 90 of brush roller 82 from where the same is fed to the bristles via small radial bores 100, which bristles will wet and clean the sound head and the other elements of the device to be cleaned.

It is understood that in the example of embodiment according to FIG. 5, the brush roller 82 may be replaced by a cleaning tape which either is closed per se, i.e. endless, and which upon operation of the driving mechanism of the cassette permanently rotates over guide rolls, or, with a finite length is wound off a supply roll and wound on a take-up roll. The supply of the cleansing fluid to the cleaning tape, also in this case, may be distributed over a predetermined period of time in a manner similar to the example of embodiment according to FIG. 5. Starting from FIG. 5, it will merely have to be borne in mind that the brush roller 82 shown therein does not include any bristles, the cleaning tape is guided along the bores 100 and that the same, by a fixed outer cover, over the major part of the circumference thereof, are externally covered so that the cleaning fluid will emerge on one side only to be passed onto the cleaning tape.

In the example of embodiment according to FIG. 6, the cassette housing, equally, is generally designated by reference numeral 10 and the inner cavity receiving the cleansing fluid is generally designated by reference numeral 12. Moreover, the cassette housing 10 includes a batching cylinder 102 having a piston 104 freely movable therein. Provided between cavity 12 and batching cylinder 102 is a line connection 106, 108 comprising a spring-loaded double-throw valve 110 having two valve bodies. Line portion 108, via another line 112, is connected to an outlet valve 114 which, normally, is kept closed, however, after insertion of the cleaning cassette into the device and upon operation of the cassette driving mechanism through sound head 56 via lever 115 is opened.

In order to fill the batching cylinder 102 with cleansing fluid from the cavity 12, the cleaning cassette is so held in the operator's hand that the inlet opening of line 106 is below the fluid level in the cavity 12. The double-throw valve 110, by means of an operating rod 116, manually, is so switched into that position in which the line connection 106, 108 is opened toward the batching cylinder 102 that the vapor or swelling pressure in the cavity 12 can urge the cleansing fluid from there into the batching cylinder 102, with cylinder 104 being displaced to the right—viewed from FIG. 6. The air escapes from the right-hand side of the batching cylinder 102 via a line 118 and the right-hand part of the double-throw valve 110 opened during loading of the batching cylinder 102 into a cavity 120 of the cassette in communication with the atmosphere.

If, thereafter, the operating rod 116 is released again, the spring-loaded double-throw valve 110 is restored into its starting position wherein the line 106 is connected to the line 118 so that the excess pressure in the cavity 12 will act upon the right-hand side of the piston 104 causing the same to tend to urge the cleansing fluid contained in the batching cylinder 102 against the outlet valve 114. As soon as the latter is opened through the cassette driving mechanism, i.e. in the present instance, through the sound head 56 via lever 115, the cleansing fluid splashes from the outlet valve 114 directly onto an endless rotating cleaning tape 122 to clean the sound head 56 and the other elements of the device to be cleaned, such as the capstan shaft 72 and the back pressure roller 58.

In the example of embodiment according to FIG. 7, the cavity 112 receiving the cleansing fluid is provided in a hollow drum 124 rotatably drivable through the cassette driving mechanism. Disposed on the circumferential wall of drum 124 are one or more outlet valves 126 that are respectively opened if an operating pin attached thereto moves upon a stationary cam 128 rigidly disposed next to drum 124. If the cleaning cassette is expected to be inserted into a device not only in the horizontal but also in the vertical position, a plurality of cams 128 may be distributed circumferentially along the drum so that an outlet valve 126, in any case, is also opened in a position in which it is below the fluid level.

In the case of example, a cleaning tape 130 runs about the drum 124. The drive of the latter, hence, is performed via the take-up drive of the device and the capstan shaft 72. The supply of the cleansing fluid to the tape 130 is directly effected by the outlet valve 126. By way of alternative, the outlet valve 126 may wet a sponge which, in turn, will wet the cleaning tape 130.

In the example of embodiment according to FIG. 7, a limit switch-off mechanism is provided—as is in the example of embodiment according to FIG. 1—causing drum 124 to stop in a predetermined torsion angle position wherein the outlet valve 126 is not in abutment with cam 128, hence, being reliably closed. The switch-off mechanism comprises a lever 132 pivotably disposed on the rear end and with the bent-off free end thereof engaging in tone arm type a helically shaped groove 134 (shown in fragments only) in a front face of drum 124. The said helically shaped groove 134 will guide the free end of the switch-off lever 132 in several rotations of drum 124 toward the center thereof until groove 134 ends all of a sudden. At that end, the switch-off lever will hook itself to thereby stop drum 124 which will automatically switch off the device.

What is claimed is:

1. A cleaning cassette for cleaning the tape engaging heads of a tape operating device having a drive means for driving the tape, comprising:
   a cassette housing adapted to fit into the device in generally the same position as a tape cassette which is normally operated by the device, said cassette housing including therein a normally closed reservoir chamber adapted to receive a cleaning liquid, said chamber normally being closable such that cleaning liquid cannot normally be removed therefrom,
   a cleaning element movably mounted and positioned in the cassette housing to frictionally engage said heads of the device upon movement thereof within the cassette housing,
   means operable when the cleaning cassette is in the device and the device drive means is operated, for causing operative driving engagement from the drive means of the device to the cleaning element, to move the cleaning element to frictionally engage the said heads,
   valve means for opening the normally closable chamber to release cleaning liquid therefrom to deliver said liquid to the cleaning element,
   and an operating means, operable only when the cleaning element is being moved by the drive means of the device, for opening the valve means of the normally closed chamber, for causing the liquid to be pressure driven out of the chamber and onto the cleaning element.

2. A cleaning cassette according to claim 1, wherein said cleaning element is an endless band.

3. A cleaning cassette according to claim 2, wherein said operating means includes means for utilizing gaseous pressure to drive the cleaning liquid out of the chamber upon opening of the valve means.

4. A cleaning cassette according to claim 3, wherein said operating means includes means for utilizing gas vapor pressure developed within the chamber to drive the cleaning liquid out of the chamber.

5. A cleaning cassette according to claim 3, wherein said operating means includes means for utilizing gas pressure generated other than from said gas vapor pressure to drive the cleaning liquid out of the chamber.

6. A cleaning cassette according to claim 3, said operating means including a control element which moves a predetermined distance as the cleaning element is moving and as liquid is being delivered to the cleaning element, and including a shut-off means for terminating driving of the cleaning element by the device, and hence stopping movement of the cleaning element and delivery of cleaning liquid, when the control element has moved said predetermined distance.

7. A cleaning cassette according to claim 1, said chamber including a one-way normally closed inlet valve for introducing liquid therein.

8. A cleaning cassette according to claim 1, said cleaning element being a rotatable brush roller, and said operating means including means for delivering cleaning liquid to the surface of the brush roller.

9. A cleaning cassette according to claim 1, said operating means including a reciprocal piston which, when moved, opens said valve means, draws a predetermined portion of liquid out of the chamber and moves the liquid to the cleaning element.

10. A cleaning cassette according to claim 9, including stop means for preventing forward movement of the piston until the cleaning element engages the heads of the device.

11. A cleaning cassette according to claim 9, including a control element operable to shut off the drive means when the piston reaches the end of its stroke.

12. A cleaning cassette according to claim 11, said control element being the said piston.

13. A cleaning cassette according to claim 12, said cleaning element being driven by a take-up drive of the device, and said control element including a pivoted lever which, when engaged by the piston, is movable to a position to stop operation of the device take-up drive.

14. A cleaning cassette according to claim 9, said valve means comprising a pair of one-way valves, one of which drives liquid toward the piston on its first stroke and the other of which opens to allow liquid toward the cleaning element on its opposite stroke.

15. A cleaning cassette according to claim 1, said operating means including a rod means for opening said valve means, and a portioning piston and cylinder, said valve means initially connecting the chamber to the piston and cylinder, and then subsequently connecting the piston and cylinder to the cleaning element.

16. A cleaning cassette according to claim 15, said rod being manually actuatable, and said piston being double acting, wherein, during the initial connection, the said piston is movable in a first direction under the force of gas from the chamber, and in the subsequent connection the piston is movable in the opposite direction under the force of gas from the chamber acting on the opposite side of the piston.

17. A cleaning cassette according to claim 1, wherein said operating means includes means for utilizing gaseous pressure to drive the cleaning liquid out of the chamber upon opening of the valve means, and including a capillary tube leading from the chamber to the valve means, and means for alternately opening and closing the valve means during the cleaning operation, until exhaustion of the liquid in the capillary tube.

18. A cleaning cassette according to claim 17, including means in the drive connection with the drive means of the device for opening and closing the valve means.

19. A cleaning cassette according to claim 1, said reservoir being in the form of a rotatable drum, said drum being rotatable by the drive means of the device to thereby drive the cleaning element.

20. A cleaning cassette according to claim 19, including a control means operatively engaged with the drum, for terminating the flow of liquid from the drum to the cleaning element.

* * * * *